(12) United States Patent
Kimura (10) Patent No.: US 11,822,148 B2
(45) Date of Patent: Nov. 21, 2023

(54) INFORMATION PROCESSING APPARATUS, IMAGE CAPTURING APPARATUS, INFORMATION PROCESSING METHOD, AND STORAGE MEDIUM

(71) Applicant: CANON KABUSHIKI KAISHA, Tokyo (JP)

(72) Inventor: Hiroaki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 17/231,954

(22) Filed: Apr. 15, 2021

(65) Prior Publication Data
US 2021/0333507 A1    Oct. 28, 2021

(30) Foreign Application Priority Data
Apr. 23, 2020   (JP) ................. 2020-076613

(51) Int. Cl.
*G02B 7/28*   (2021.01)
*G02B 7/09*   (2021.01)
*H04N 23/695*   (2023.01)

(52) U.S. Cl.
CPC ............... *G02B 7/282* (2013.01); *G02B 7/09* (2013.01); *H04N 23/695* (2023.01)

(58) Field of Classification Search
CPC .......... G02B 7/282; G02B 7/09; G02B 7/102; G02B 7/08; H04N 23/695; H04N 23/67; H04N 23/69
See application file for complete search history.

(56) References Cited

U.S. PATENT DOCUMENTS

2012/0268645 A1* 10/2012 Chen .................. H04N 23/67
348/E5.045

FOREIGN PATENT DOCUMENTS

| JP | H06300962 A | 10/1994 |
| JP | 2016 090845 A | 5/2016 |
| WO | 2013/055737 A1 | 4/2013 |

* cited by examiner

*Primary Examiner* — James C. Jones
(74) *Attorney, Agent, or Firm* — CANON U.S.A., INC. IP Division (57) ABSTRACT

An information processing apparatus includes a first obtaining unit configured to obtain optical information about an image capturing apparatus including an imaging optical system including at least one movable lens movable in an optical axis direction, a second obtaining unit configured to obtain orientation information indicating an orientation of a lens barrel holding the imaging optical system, a third obtaining unit configured to obtain installation information indicating an installation direction of the image capturing apparatus, and a control unit configured to control a position of the movable lens based on the optical information, the orientation information, and the installation information.

14 Claims, 10 Drawing Sheets

INFORMATION PROCESSING APPARATUS, IMAGE CAPTURING APPARATUS, INFORMATION PROCESSING METHOD, AND STORAGE MEDIUM

BACKGROUND OF THE INVENTION

Field of the Invention

The present invention relates to an information processing apparatus, an information processing method, and an image capturing apparatus.

Description of the Related Art

A conventional technique is known that detects an orientation of a lens barrel and corrects an extension amount of a focus lens based on orientation information (see Japanese Patent Application Laid-Open No. 6-300962).

SUMMARY OF THE INVENTION

According to an aspect of the present invention, an information processing apparatus includes a first obtaining unit configured to obtain optical information about an image capturing apparatus including an imaging optical system including at least one movable lens movable in an optical axis direction, a second obtaining unit configured to obtain orientation information indicating an orientation of a lens barrel holding the imaging optical system, a third obtaining unit configured to obtain installation information indicating an installation direction of the image capturing apparatus, and a control unit configured to control a position of the movable lens based on the optical information, the orientation information, and the installation information.

Further features of the present invention will become apparent from the following description of exemplary embodiments with reference to the attached drawings.

DESCRIPTION OF THE EMBODIMENTS

Various exemplary embodiments of the present invention will be described in detail below with reference to the attached drawings. Each of the embodiments of the present invention described below can be implemented solely or as a combination of a plurality of the embodiments or features thereof where necessary or where the combination of elements or features from individual embodiments in a single embodiment is beneficial.

The following exemplary embodiments are merely examples of implementation of the present invention and can be appropriately modified or changed depending on an individual configuration and various conditions of an apparatus to which the present invention is applied. Thus, the present invention is not to be limited to the following exemplary embodiments.

First, a first exemplary embodiment of the present invention is described.

Figure 1:
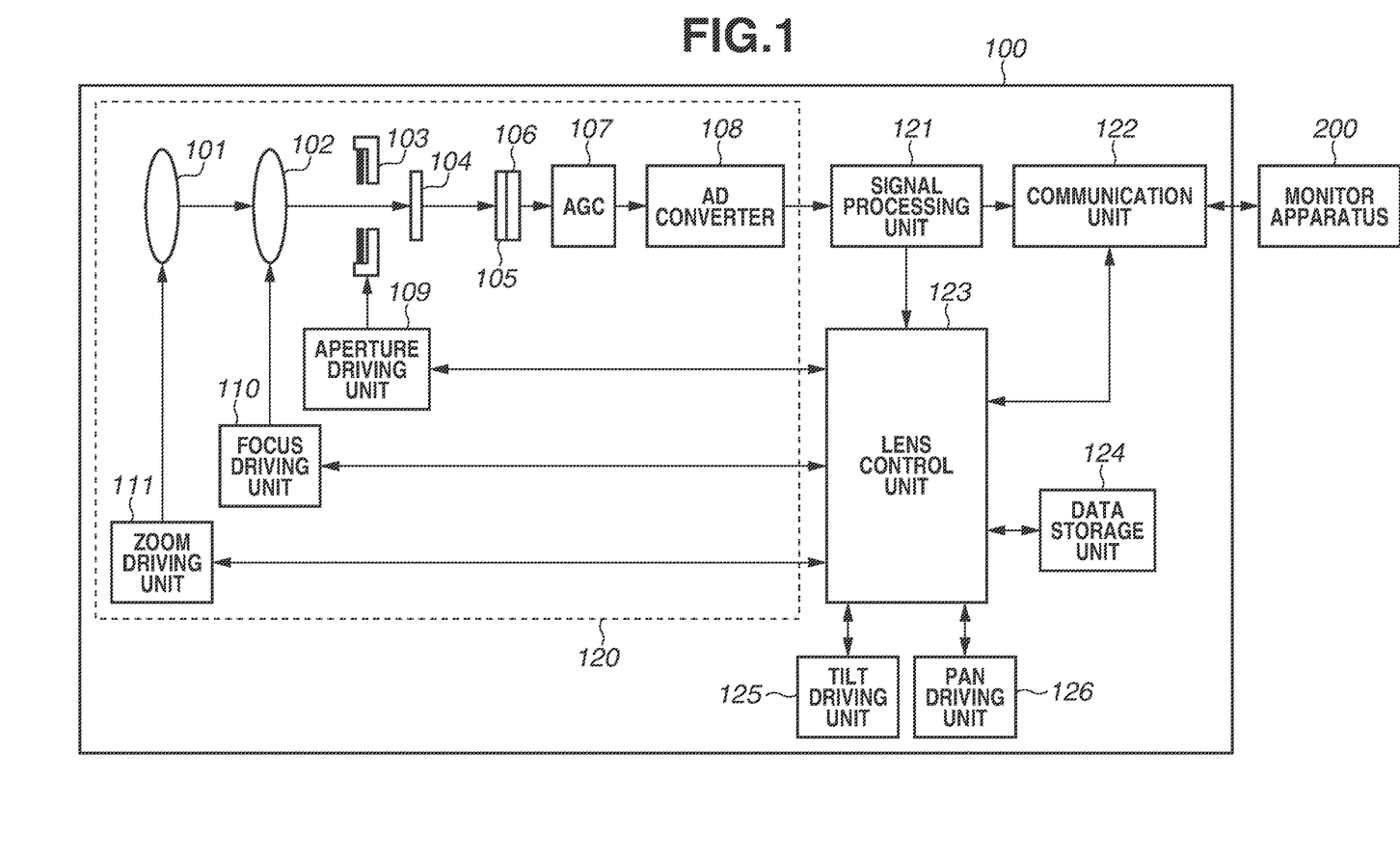
FIG. 1 is a block diagram illustrating an example of a configuration of an image capturing apparatus according to a first exemplary embodiment.

FIG. 1 is a block diagram illustrating an example of a configuration of an image capturing apparatus 100 according to the first exemplary embodiment.

As illustrated in FIG. 1, the image capturing apparatus 100 includes an image capturing unit 120, a signal processing unit 121, a communication unit 122, a lens control unit 123, a data storage unit 124, a tilt driving unit 125, and a pan driving unit 126.

The image capturing unit 120 includes an imaging optical system. The imaging optical system is held by a lens barrel. The imaging optical system includes at least one movable lens that can move in an optical axis direction. Specifically, the imaging optical system includes a zoom lens 101 that changes a focal length by moving in the optical axis direction, a focus lens 102 that changes a focus position by moving in the optical axis direction, and an aperture unit 103 that adjusts an amount of light.

In the image capturing unit 120, light passing through the imaging optical system forms an object image as an optical image on an image capturing element 106 via a band-pass filter (BPF) 104 and a color filter 105. The BPF 104 can move forward or backward relative to an optical path of the imaging optical system.

The object image is photoelectrically converted by the image capturing element 106. An analog electrical signal (imaging signal) output from the image capturing element 106 is subjected to gain adjustment by an automatic gain control (AGC) 107 and is converted into a digital imaging signal by an analog-to-digital (AD) converter 108.

The image capturing unit 120 includes an aperture driving unit 109, a focus driving unit 110, and a zoom driving unit 111.

The aperture driving unit 109 controls an aperture value of the aperture unit 103 based on an aperture setting value specified by the lens control unit 123 described below.

The focus driving unit 110 controls a position of the focus lens 102 (focus position) based on a focus setting value specified by the lens control unit 123.

The zoom driving unit 111 controls a position of the zoom lens 101 (zoom position) based on a zoom setting value specified by the lens control unit 123.

The signal processing unit 121 performs various types of image processing on the digital imaging signal input from the image capturing unit 120 to generate a captured image (video). The captured image (video) generated in the signal processing unit 121 is output to the communication unit 122 and the lens control unit 123.

The communication unit 122 transmits a video signal generated in the signal processing unit 121 to a monitor apparatus 200 via a network or the like. Further, the communication unit 122 outputs a control signal to the lens control unit 123 in response to an instruction from an external apparatus such as the monitor apparatus 200.

The monitor apparatus 200 is connected to the image capturing apparatus 100 using wired or wireless communication and can be operated by a user. The monitor apparatus 200 may be a personal computer (PC) equipped with a display unit and an input unit. The monitor apparatus 200 can display the captured image (video) transmitted from the image capturing apparatus 100 and an input screen for inputting an instruction for the image capturing apparatus 100 on the display unit. The user can operate the input unit including a keyboard and a pointing device such as a mouse to issue the instruction for the image capturing apparatus 100 from the input screen displayed on the display unit.

The lens control unit 123 can perform a focus control, such as auto focusing (AF) and manual focusing (MF), a zoom control, and an aperture control based on the control signal from the communication unit 122. The lens control unit 123 obtains a current aperture value from the aperture driving unit 109, a current focus position from the focus driving unit 110, and a current zoom position from the zoom driving unit 111, and specifies a setting value to each of the driving units 109 to 111 based on the above-described control signal.

Further, the lens control unit 123 can control a direction and an orientation of the lens barrel, namely an angle in a tilt direction (tilt angle) and an angle in a pan direction (pan angle) based on the control signal from the communication unit 122. The lens control unit 123 obtains angle information such as a current tilt angle and a current pan angle from the tilt driving unit 125 and the pan driving unit 126, respectively, and specifies a driving angle to each of the driving units 125 and 126 based on the above-described control signal.

The tilt driving unit 125 controls the angle of the lens barrel in the tilt direction based on the driving angle provided from the lens control unit 123. The pan driving unit 126 controls the angle of the lens barrel in the pan direction based on the driving angle provided from the lens control unit 123.

Figure 2A:
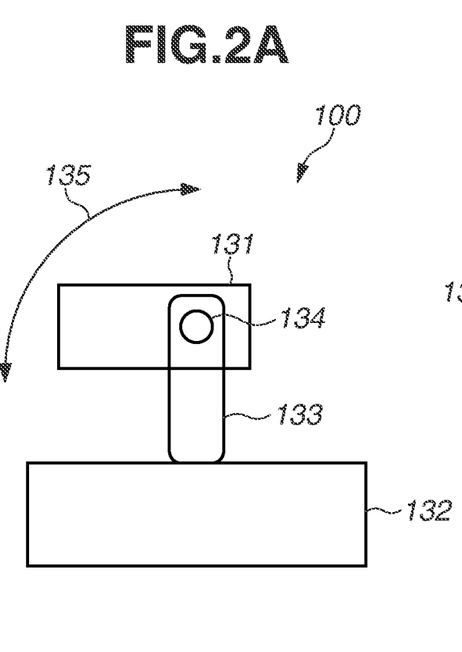
FIGS. 2A and 2B are schematic diagrams illustrating the image capturing apparatus.
Figure 2B:
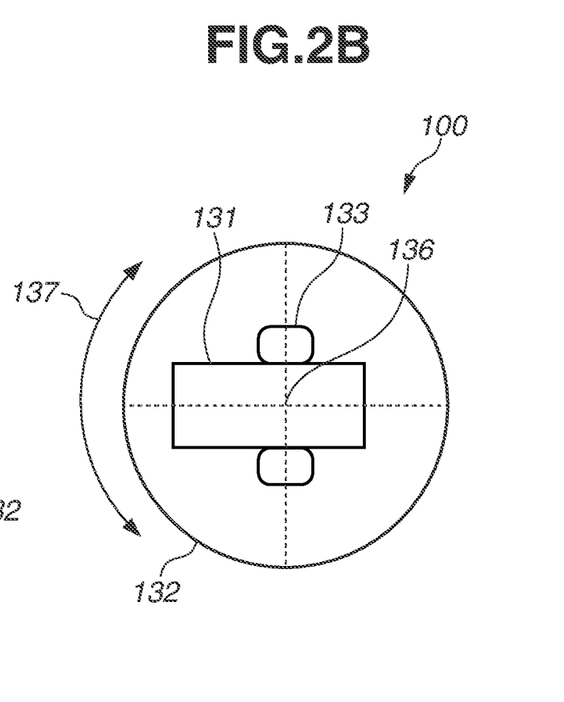

FIGS. 2A and 2B are a side view and a top view, respectively, schematically illustrating a configuration of the image capturing apparatus 100. FIGS. 2A and 2B illustrate a lens barrel 131 and a tilt/pan base 132.

The tilt/pan base 132 holds the lens barrel 131 via an arm portion 133. The arm portion 133 holds the lens barrel 131 in such a manner that the lens barrel 131 can perform a tilt operation about a tilt center 134 illustrated in FIG. 2A. The tilt driving unit 125 in FIG. 1 can change the orientation of the lens barrel 131 in a direction of an arrow 135 illustrated in FIG. 2A. The tilt/pan base 132 holds the lens barrel 131 in such a manner that the lens barrel 131 can perform a pan operation about a pan center 136 illustrated in FIG. 2B. The pan driving unit 126 in FIG. 1 can change the direction of the lens barrel 131 in a direction of an arrow 137 illustrated in FIG. 2B.

Referring back to FIG. 1, the lens control unit 123 can further obtain installation information indicating an installation direction of an apparatus body of the image capturing apparatus 100.

In the present exemplary embodiment, a case is described in which the image capturing apparatus 100 is installed in such a manner that the orientation of the lens barrel is changed in a gravity direction in a case where the lens barrel is moved in the tilt direction, and the orientation of the lens barrel is changed in a direction perpendicular to the gravity direction in a case where the lens barrel is moved in the pan direction. In this case, the above-described installation information indicates whether the image capturing apparatus 100 is installed in a normal position (floor installation) or in an inverted position (ceiling-suspended installation) in a vertical direction. Further, in the present exemplary embodiment, the lens control unit 123 obtains the installation information designated by the user.

The lens control unit 123 controls a position of the movable lens included in the imaging optical system based on optical information about the image capturing apparatus 100, orientation information about the lens barrel, and the installation information about the image capturing apparatus 100. The above-described optical information includes at least one of information about the focal length of the imaging optical system and information about an object distance. Further, the above-described orientation information includes at least one of the angle in the pan direction and the angle in the tilt direction of the lens barrel.

The lens control unit 123 controls the position of the movable lens using a lens position correction table stored in the data storage unit 124.

The data storage unit 124 stores the lens position correction table in which the optical information about the image capturing apparatus 100 and a control amount of the position of the movable lens as a control target are associated with each other for each orientation of the lens barrel.

The data storage unit 124 stores the above-described lens position correction table for each installation direction of the apparatus body of the image capturing apparatus 100. More specifically, the data storage unit 124 stores at least the lens position correction table for the normal position installation and the lens position correction table for the inverted position installation. The control amount set in each of the lens position correction tables may be calculated from an actual measurement of an actual apparatus or may be a value obtained by simulation.

Figure 3:
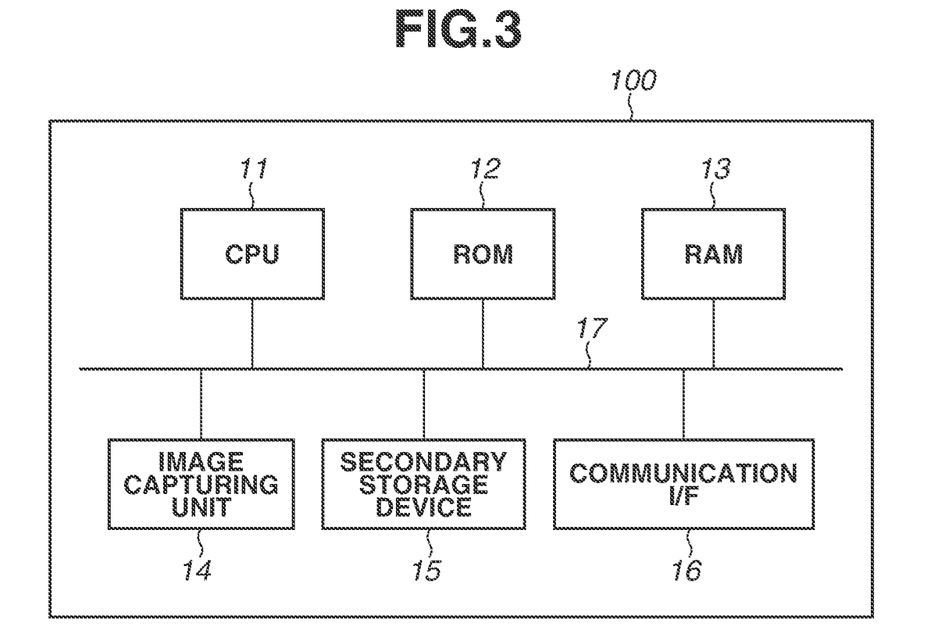
FIG. 3 is a block diagram illustrating an example of a hardware configuration of the image capturing apparatus.

FIG. 3 illustrates an example of a hardware configuration of the image capturing apparatus 100.

The image capturing apparatus 100 includes a central processing unit (CPU) 11, a read-only memory (ROM) 12, a random access memory (RAM) 13, an image capturing unit 14, a secondary storage device 15, a communication interface (I/F) 16, and a system bus 17.

The CPU 11 integrally controls operation in the image capturing apparatus 100. The ROM 12 is a nonvolatile memory that stores a program and data necessary for the CPU 11 to execute processing. The program may be stored in the secondary storage device 15 or a removable storage medium (not illustrated). The RAM 13 functions as a main memory and a work area of the CPU 11. The CPU 11 loads a necessary program from the ROM 12 to the RAM 13 in executing the processing and implements various functional operations by executing the program.

The image capturing unit 14 corresponds to the image capturing unit 120 in FIG. 1. The secondary storage device 15 stores, for example, various pieces of data and information necessary for the CPU 11 to execute the processing using the program. The secondary storage device 15 further stores, for example, various pieces of data and information obtained by the CPU 11 executing the processing using the program. The communication I/F 16 provides a communication interface for transmitting and receiving data to and from the external apparatus such as the monitor apparatus 200 via the network.

Some of the functions of components in the image capturing apparatus 100 illustrated in FIG. 1 can be implemented by the CPU 11 executing programs. However, at least some of the components in the image capturing apparatus 100 illustrated in FIG. 1 may be operated as dedicated hardware. In this case, the dedicated hardware operates under control by the CPU 11.

In the present exemplary embodiment, a case is described in which the image capturing apparatus 100 operates as an information processing apparatus that controls the position of the movable lens based on the optical information, the orientation information about the lens barrel, and the installation information about the apparatus body. Alternatively, a general PC or another device connected to the image capturing apparatus 100 in a communicable manner may operate as the above-described information processing apparatus.

In the present exemplary embodiment, a case is described in which the image capturing apparatus 100 is a lens-integrated type image capturing apparatus that integrally includes the imaging optical system (lens barrel) therein. Alternatively, the image capturing apparatus 100 may be a lens interchangeable type image capturing apparatus that includes an interchangeable imaging optical system. The same applies to an image capturing apparatus 100 according to other exemplary embodiments described below.

Lens position control performed by the image capturing apparatus 100 is described in detail below.

First, a mechanism of a focus lens group is described with reference to FIG. 4.

Figure 4:
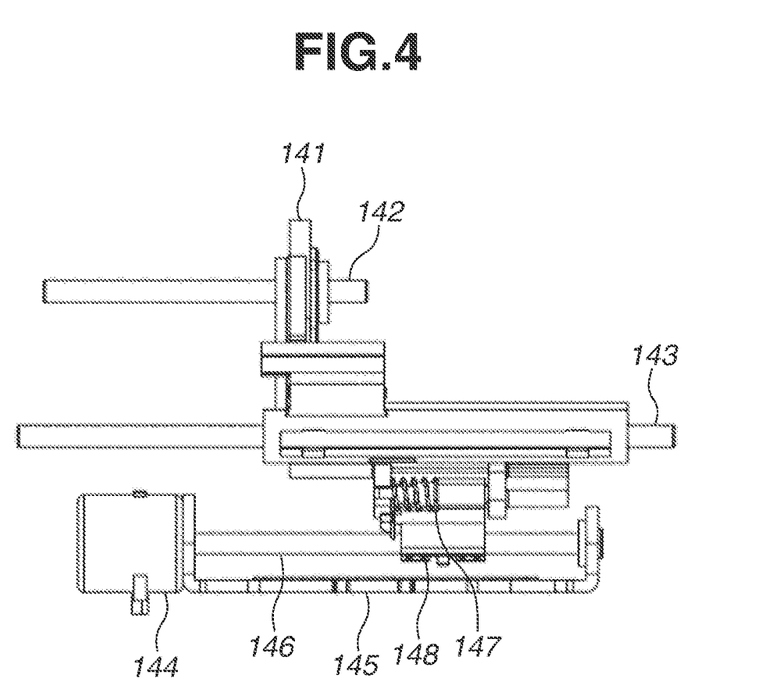
FIG. 4 is a diagram illustrating a mechanical configuration of a focus lens group.

As illustrated in FIG. 4, a focus group moving frame 141 as a lens holding member for holding the focus lens group is supported to be movable in the optical axis direction by guide bars 142 and 143 that are arranged in parallel with an optical axis. The optical axis direction is a right-and-left direction in FIG. 4.

The guide bars 142 and 143 are positioned and fixed by front and rear fixing cylinders (not illustrated).

A sleeve portion formed in the focus group moving frame 141 is movably engaged with the guide bar 142. Further, a U-shaped groove portion formed in the focus group moving frame 141 is movably engaged with the guide bar 143.

A focus motor 144 includes a stepping motor and is held by a motor holding plate 145 made of sheet metal. The focus motor 144 includes a lead screw 146 that is coaxial with a rotating rotor. The lead screw 146 is meshed with a rack 148 incorporated in the focus group moving frame 141 via a torsion coil spring 147.

With the above-described configuration, the focus lens group is driven in the optical axis direction by rotation of the rotor in the focus motor 144. At that time, the focus group moving frame 141, the rack 148, and the lead screw 146 are urged by a spring load of the torsion coil spring 147, and thus a backlash is prevented in engagement or meshing of each component.

Next, control of the focus lens 102 is described.

If the focus lens 102 moves in the optical axis direction, a light shielding plate portion formed in the focus group moving frame 141 enters and exits a gap between a light emitting portion and a light receiving portion included in a photointerrupter fixed to the front fixing cylinder. Accordingly, a light shielding state and a light receiving state are switched.

The photointerrupter detects this switching and thus detects whether the focus lens 102 is located at a reference position. After the reference position has been detected, the number of driving pulses to be supplied to the focus motor 144 as the stepping motor is counted, whereby a position of the focus lens group can be controlled to a target position.

A mechanism and control of the zoom lens 101 are similar to those of the focus lens 102, and thus descriptions thereof are omitted.

Figure 5A:
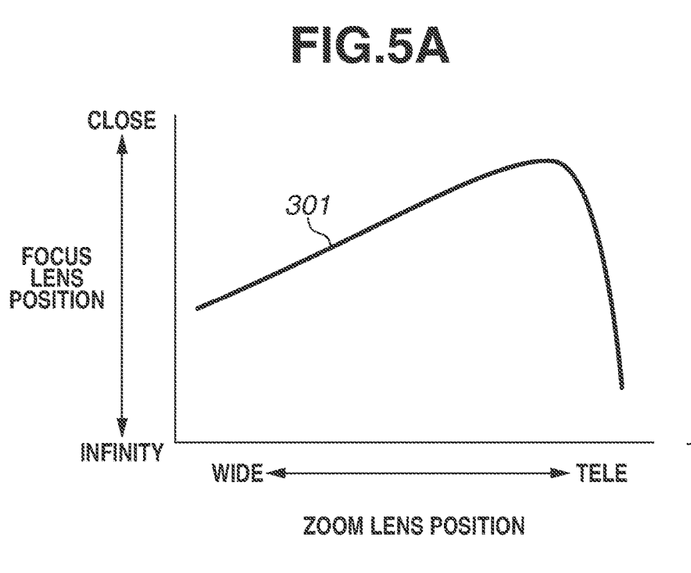
FIGS. 5A and 5B are cam trace diagrams.

FIG. 5A is a cam trace diagram of the lens barrel of the image capturing apparatus 100 according to the present exemplary embodiment. In FIG. 5A, a horizontal axis indicates the position of the zoom lens 101, and a vertical axis indicates the position of the focus lens 102. A left side and a right side of the horizontal axis respectively represent a WIDE position (wide-angle end) and a TELE position (telephoto end). In addition, an upper side and a lower side of the vertical axis respectively represent a close side and an infinity side. Each lens position can be calculated based on the reference position detected using the photointerrupter.

A cam curve 301 in FIG. 5A represents a relationship between the position of the zoom lens 101 and the position of the focus lens 102 when an object existing at an infinite distance is in focus. The zoom lens 101 and the focus lens 102 are driven along the cam curve 301, and thus, an in-focus state can be maintained in a case where an image of the object existing at the infinite distance is captured.

Figure 5B:
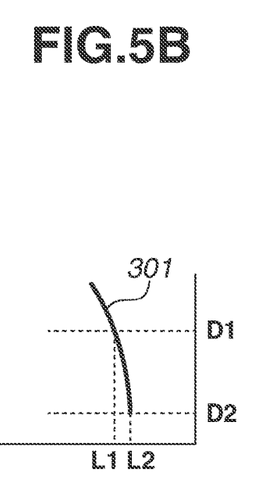

FIG. 5B is an enlarged view of the cam curve 301 near the TELE position in FIG. 5A.

FIG. 5B indicates that, in a case where the zoom lens 101 is located at a position L1, the focus lens 102 is in focus if the focus lens 102 is located at a position D1 FIG. 5B further indicates that, in a case where the zoom lens 101 is located at a position L2, the focus lens 102 is in focus if the focus lens 102 is located at a position D2.

The movable lenses such as the zoom lens 101 and the focus lens 102 are held by a shaft, a rack, and the like, and are usually configured to have a mounting backlash to reduce friction during movement and to improve assemblability. Thus, if the orientation of the lens barrel is changed, the position of each movable lens may change.

In other words, if the orientation of the lens barrel is changed in the in-focus state in which the zoom lens 101 is located at the position L2 and the focus lens 102 is located at the position D2, the zoom lens 101 may move to the position L1 due to an influence of the above-described mounting backlash or the like. In this case, the position of the focus lens 102 deviates from the position D1 at which the in-focus state is attained, and thus the focus lens 102 is brought into a state in which the in-focus state cannot be attained.

The position control of the movable lens is open control, and thus, for example, movement of the movable lens caused by the influence of the mounting backlash cannot be detected.

Thus, if the zoom lens 101 that is controlled to be at the position L2 is moved to the position L1 due to the influence of the mounting backlash or the like, the focus lens 102 is out of focus by an amount corresponding to a difference between the position D1 and the position D2 as the position of the focus lens 102.

As described above, if the positions of the zoom lens 101 and the focus lens 102 deviate from the cam curve 301, the lenses are out of a best focus state, i.e., in an out-of-focus state.

Particularly, in a zoom lens barrel that performs zooming and focusing by driving a plurality of lens groups in the optical axis direction as in the present exemplary embodiment, a change in the position of the plurality of lens groups affects the focus position. In addition, there is a recent trend of an increase in zoom magnification and miniaturization of an apparatus, so that sensitivity to the position of the lens group tends to increase. If the sensitivity to the position of the lens group increases, a change in the position of the lens group greatly affects the focus position. In other words, even a minute change in the position of the lens group can cause defocusing that can be recognized in an image and, in some cases, blurring that is large enough to hinder recognition of the object.

In order to prevent the change in the position of the lens group due to a change in the orientation, it is necessary to eliminate the mounting backlash of the lens group with respect to the holding member. However, in a case where a measure is taken to eliminate the backlash, the structure can become complicated or large-scaled and can lead to increases in size and cost of the apparatus.

Thus, in order to avoid the defocusing due to the change in the orientation of the lens barrel without increasing the size of the apparatus, there is a conventional technique for correcting a moving distance of the focus lens based on the orientation information about the lens barrel. In the technique, a plurality of tables each storing a relationship between an object distance and a moving distance of the focus lens is prepared in correspondence with the orientation information about the lens barrel, and focus correction is performed by selecting the table corresponding to the orientation of the lens barrel.

However, in the above-described technique, the focus correction is performed by controlling the position of the focus lens based only on the orientation information about the lens barrel. In other words, the installation direction of the apparatus body is not considered. Since the change in the position of the lens group is caused by actions of the gravity and a holding method of the lens group, an amount of change in the position of the lens group can be different if a relationship between the gravity direction of the lens group and a direction of a holding force of the lens group is changed. In other words, depending on the installation direction of the apparatus body, the amount of change in the position of the lens group can be different even if the lens barrel is in the same orientation.

Figure 6A:
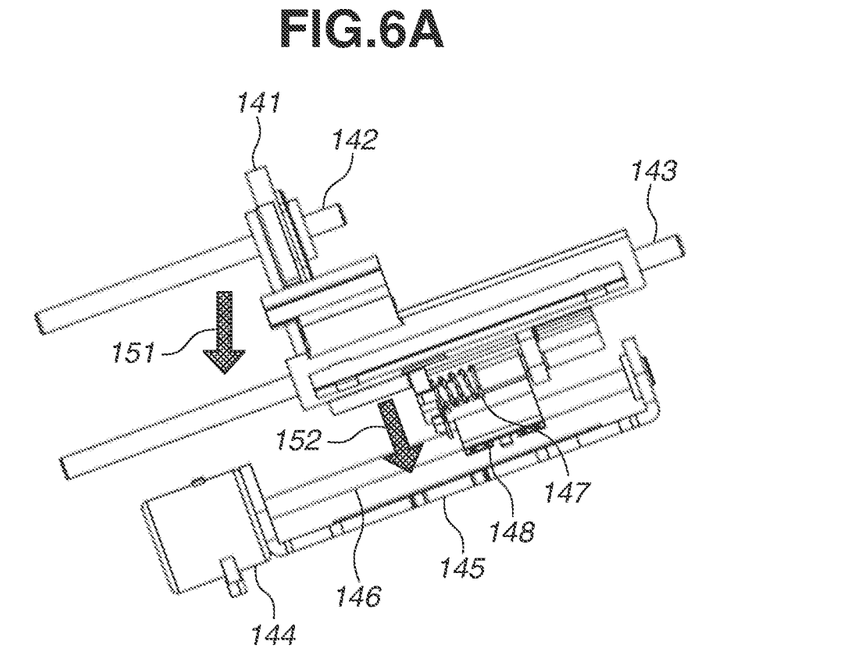
FIGS. 6A and 6B are diagrams illustrating a change in a position of the focus lens group due to a difference in an installation direction of the image capturing apparatus.
Figure 6B:
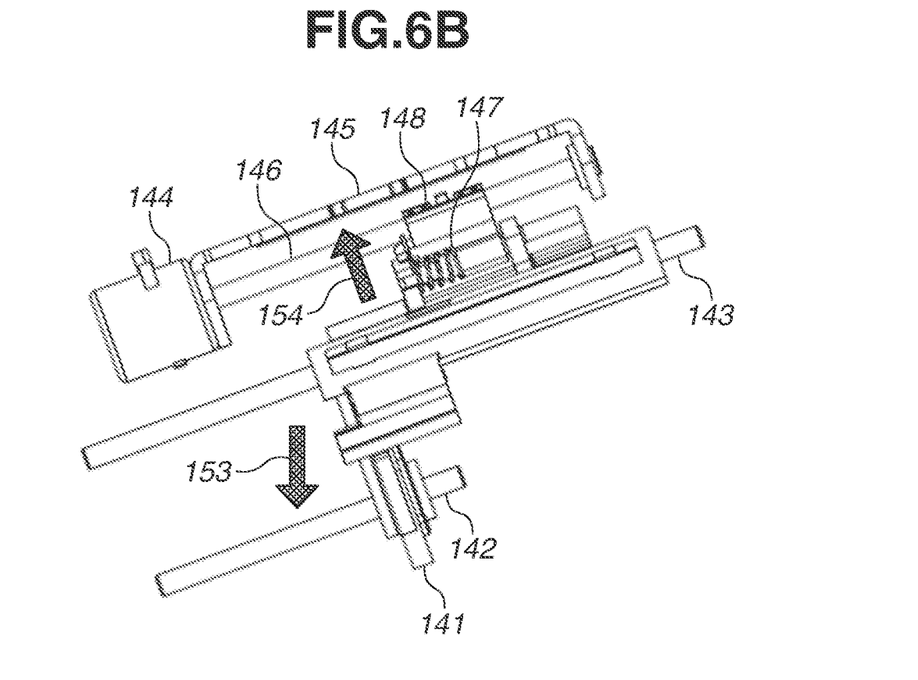

For example, in a case where the lens barrel is directed downward at an angle of 20 degrees, the amount of change in the position of the lens group is different between when the apparatus body is installed in the normal position as illustrated in FIG. 6A and when the apparatus body is installed in the inverted position as illustrated in FIG. 6B.

In the case of FIG. 6A, a self-weight of the focus group moving frame 141 holding the focus lens group is applied in a direction of an arrow 151. Further, an urging force generated by the spring load of the coil spring 147 is applied to the focus group moving frame 141 in a direction of an arrow 152.

In contrast, in the case of FIG. 6B, the self-weight of the focus group moving frame 141 holding the focus lens group is applied in a direction of an arrow 153. Further, the urging force generated by the spring load of the coil spring 147 is applied to the focus group moving frame 141 in a direction of an arrow 154.

As described above, even if the lens barrel is in the same orientation, the position of the lens group can be different because the direction of the force applied to the lens group changes depending on the installation direction of the apparatus body. Therefore, the focus correction cannot be appropriately performed by correcting the lens position based only on the orientation information about the lens barrel as in the case of the conventional technique.

Thus, the image capturing apparatus 100 according to the present exemplary embodiment corrects the change in the position of the movable lens in consideration of the installation information indicating the installation direction of the apparatus body of the image capturing apparatus 100 in addition to the orientation information about the lens barrel.

In the present exemplary embodiment, the lens control unit 123 controls the position of the movable lens based on the optical information about the image capturing apparatus 100, the orientation information about the lens barrel, and the installation information about the image capturing apparatus 100 while taking into account an amount of change in the position of the movable lens caused by a change in the orientation of the lens barrel.

The lens control unit 123 obtains zoom position information and focus position information as the optical information about the image capturing apparatus 100. These pieces of information are movement conditions for the movable lens that are determined based on the focal length and a predetermined object distance. The lens control unit 123 also obtains the angle in the tilt direction (tilt angle) in which the orientation of the lens barrel is changed in the gravity direction as the orientation information about the lens barrel. The lens control unit 123 controls the position of the focus lens 102 as the position of the above-described movable lens based on these pieces of information.

The data storage unit 124 stores each lens position correction table in which the optical information (the zoom position and the focus position) of the image capturing apparatus 100 is associated with a correction amount of the position of the focus lens 102 for each orientation of the lens barrel for each installation direction of the image capturing apparatus 100. The above-described correction amount is a correction amount of the focus position for correcting the defocusing that can be caused by the change in the position of the movable lens due to the change in the orientation of the lens barrel, and is based on the amount of change in the position of the movable lens due to the change in the orientation of the lens barrel. The correction amount includes a correction direction of the focus position.

The lens control unit 123 determines the installation direction of the image capturing apparatus 100 based on the installation information about the image capturing apparatus 100 and selects the lens position correction table corresponding to the determined installation direction from among the plurality of the lens position correction tables stored in the data storage unit 124. The lens control unit 123 uses the selected lens position correction table to derive a correction amount associated with the tilt angle of the lens barrel, the zoom position, and the focus position. Then, the lens control unit 123 performs control so that the position of the focus lens 102 is moved from the focus position obtained as the optical information by the above-described correction amount that has been derived.

An operation of the image capturing apparatus 100 according to the present exemplary embodiment is described below.

Figure 7:
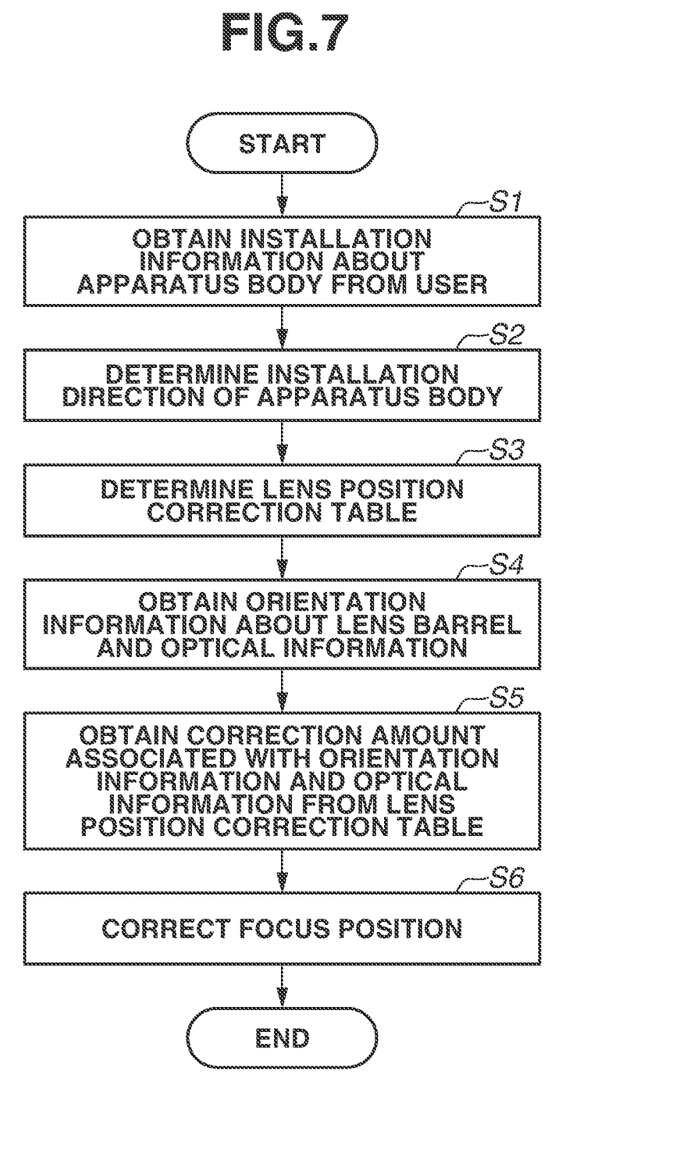
FIG. 7 is a flowchart illustrating processing for controlling a lens position according to the first exemplary embodiment.

FIG. 7 is a flowchart illustrating a processing procedure of the lens position control executed by the image capturing apparatus 100 according to the present exemplary embodiment. Focus lens position control for controlling the position of the focus lens 102 is described here as the lens position control.

The processing in FIG. 7 is started, for example, at a timing when the image capturing apparatus 100 starts an image capturing operation. However, the timing to start the processing in FIG. 7 is not limited to the above-described timing. The image capturing apparatus 100 can implement each step illustrated in FIG. 7 by the CPU 11, illustrated in FIG. 3, reading and executing a necessary program. In the following description, a step in the flowchart is indicated with a prefix "S" followed by a step number.

First, in step S1, the image capturing apparatus 100 receives designation of the installation information indicating the installation direction of the apparatus body from the user. Specifically, the image capturing apparatus 100 obtains the installation information designated by the user from the monitor apparatus 200 via the network. The installation information is information indicating whether the image capturing apparatus 100 is in the normal position installation or the inverted position installation (ceiling-suspended installation).

It is not necessary to perform the processing in step S1 every time the lens position control is executed. In a case where it is evident that the installation direction of the image capturing apparatus 100 is not changed, the lens position control may be executed using the installation information, which has been designated by a user in advance.

In step S2, the image capturing apparatus 100 determines the installation direction of the apparatus body from the installation information obtained in step S1.

In step S3, the image capturing apparatus 100 selects the lens position correction table based on the installation direction of the apparatus body determined in step S2.

As described above, if the installation direction of the apparatus body is different, the position of the movable lens is different even if the orientation of the lens barrel is the same and the zoom position and the focus position are the same in control. Thus, it is necessary to change the correction amount of the position of the focus lens 102 based on the installation direction of the apparatus body. In step S3, the image capturing apparatus 100 selects the lens position correction table corresponding to the installation direction of the apparatus body and determines the selected lens position correction table as a table used for controlling the position of the focus lens 102.

In step S4, the image capturing apparatus 100 obtains the orientation information about the lens barrel and the optical information. The above-described orientation information is information indicating the tilt angle of the lens barrel, and the above-described optical information is the zoom position information and the focus position information.

In step S5, the image capturing apparatus 100 obtains the correction amount associated with the orientation information and the optical information obtained in step S4 by referring to the lens position correction table determined in step S3.

In step S6, the image capturing apparatus 100 controls the position of the focus lens 102 by correcting the movement condition (focus position) of the focus lens 102 by the correction amount obtained in step S7.

In the above-described exemplary embodiment, the case is described in which the focus position is corrected in the lens position control, but the position of the movable lens other than the focus lens, such as the zoom lens, can also be corrected in the lens position control. The same effect as that of the above-described exemplary embodiment can be obtained in such a case. The same applies to other exemplary embodiments described below.

As described above, the image capturing apparatus 100 according to the present exemplary embodiment obtains the optical information about the image capturing apparatus 100, the orientation information indicating the orientation of the lens barrel, and the installation information indicating the installation direction of the image capturing apparatus 100, and controls the position of the movable lens based on these pieces of information. Specifically, the image capturing apparatus 100 corrects the position of the movable lens based on the amount of change in the position of the movable lens caused by at least one of the change in the orientation of the lens barrel and the change in the installation direction of the image capturing apparatus 100.

As described above, the image capturing apparatus 100 according to the present exemplary embodiment controls the position of the movable lens in consideration of not only the orientation of the lens barrel but also the installation direction of the image capturing apparatus 100 to correct the defocusing due to the change in the position of the movable lens caused by the change in the orientation of the lens barrel. Accordingly, even if the installation direction of the apparatus body or the orientation of the lens barrel changes, the focus correction can be performed with high accuracy.

Further, the image capturing apparatus 100 can include the plurality of the lens position correction tables for installation directions of the apparatus body, and can determine the installation direction of the apparatus body based on the obtained installation information and use the lens position correction table corresponding to the determined installation direction in the lens position control. The lens position correction table can be a table in which the optical information about the image capturing apparatus is associated with the correction amount of the position of the movable lens for each orientation of the lens barrel. Accordingly, the control amount of the movable lens for correcting the defocusing due to the change in the position of the movable lens caused by the change in the orientation of the lens barrel can be easily derived in consideration of the installation direction of the apparatus body, and thus the focus correction can be appropriately performed.

The image capturing apparatus 100 can have a function of determining whether at least one of the orientation of the lens barrel and the installation direction of the image capturing apparatus 100 changes with respect to the gravity direction. In a case where it is determined that any one of the above changes, the image capturing apparatus 100 performs control so that the position of the movable lens is moved from the position of the movable lens determined based on the optical information by the amount of change in the position of the movable lens caused by the above-described change. On the other hand, in a case where it is determined that none of the above change, the image capturing apparatus 100 does not perform correction by the above-described amount of change in the position of the movable lens. In other words, the image capturing apparatus 100 performs control so that the position of the movable lens will be the position of the movable lens determined based on the optical information. Accordingly, a processing load can be reduced.

Next, a second exemplary embodiment according to the present invention is described.

In the above-described first exemplary embodiment, the case is described in which the installation information indicating the installation direction of the apparatus body designated by the user is obtained. In the second exemplary embodiment, a case is described in which the installation information is obtained based on an output of a gravity sensor.

Figure 8:
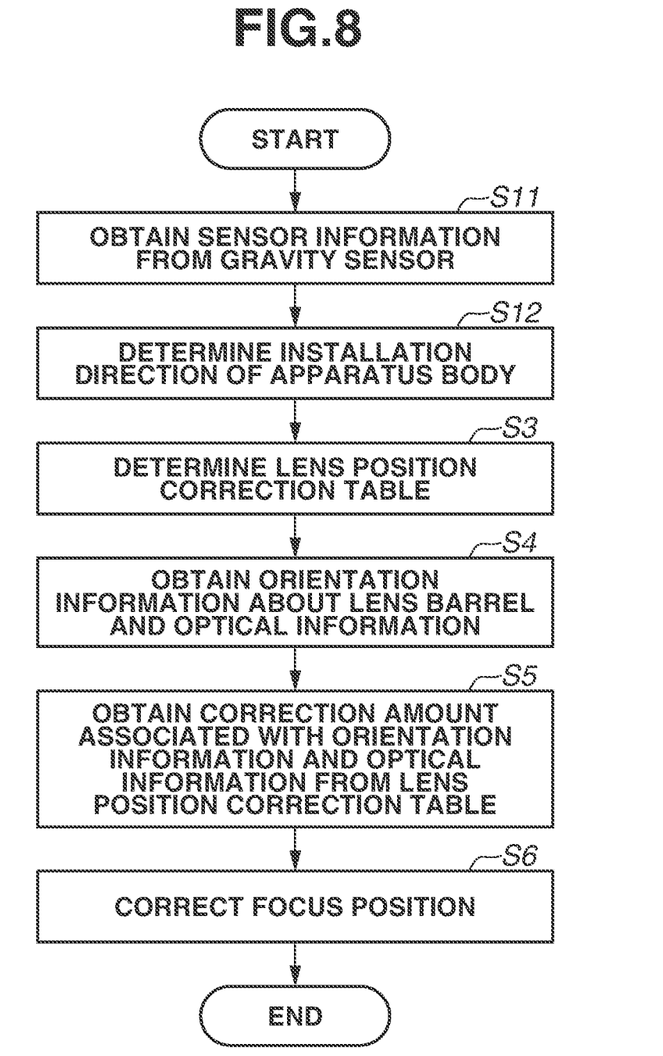
FIG. 8 is a flowchart illustrating processing for controlling a lens position according to a second exemplary embodiment.

FIG. 8 is a flowchart illustrating operation of the image capturing apparatus 100 according to the present exemplary embodiment. In FIG. 8, steps for performing the same processing as those in FIG. 7 are denoted by the same step numbers as those in FIG. 7, and processing different from that in FIG. 7 is mainly described below.

In step S11, the image capturing apparatus 100 obtains an output from the gravity sensor provided in the apparatus body as the installation information indicating the installation direction of the apparatus body.

In step S12, the image capturing apparatus 100 determines the installation direction of the apparatus body based on the output from the gravity sensor obtained in step S11.

As described above, the image capturing apparatus 100 according to the present exemplary embodiment can determine the installation direction of the apparatus body without obtaining the installation information indicating the installation direction of the apparatus body from the user and can reduce a burden on the user.

Some image capturing apparatuses have a function of inverting an orientation of a captured image based on the installation direction of the apparatus body. In such a case, the installation direction of the apparatus body can be determined by obtaining the installation information about the apparatus body based on an upper direction and a lower direction in the captured image.

Next, a third exemplary embodiment according to the present invention is described.

In the above-described first and second exemplary embodiments, the cases are described in which only the position of the movable lens is controlled in the lens position control. In the third exemplary embodiment, a case is described in which a controllable range of the movable lens is also changed in the lens position control.

Figure 9:
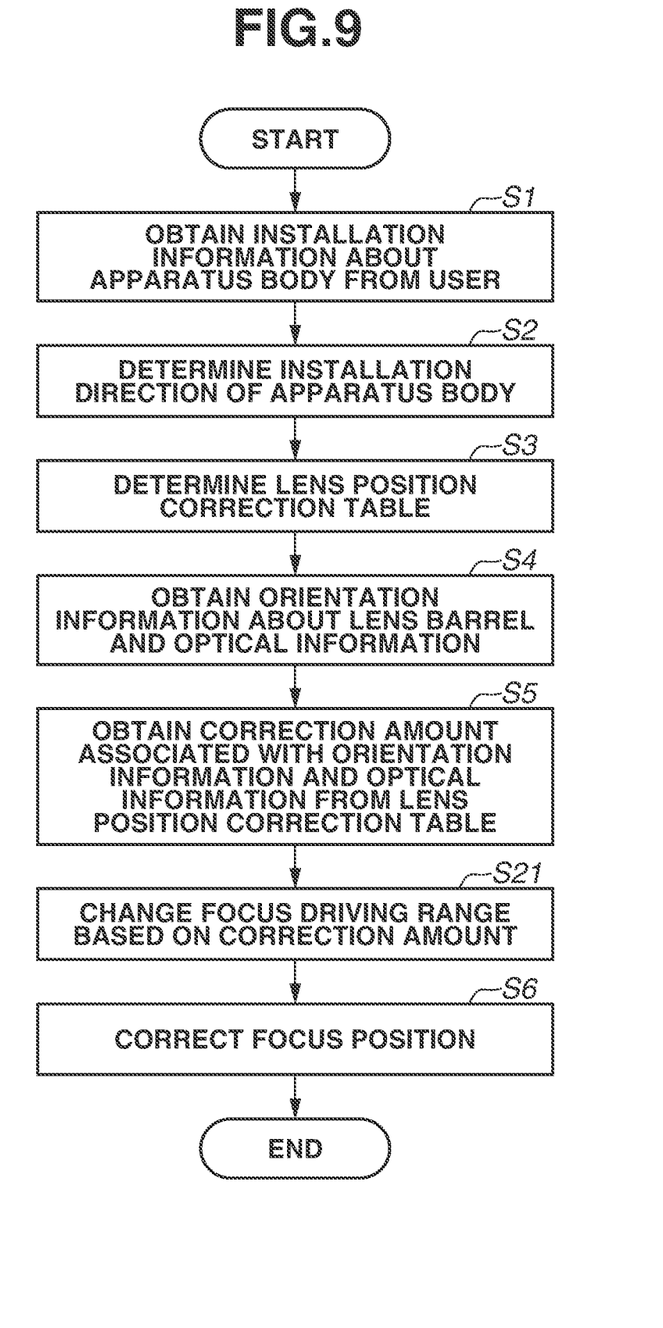
FIG. 9 is a flowchart illustrating processing for controlling a lens position according to a third exemplary embodiment.

FIG. 9 is a flowchart illustrating operation of the image capturing apparatus 100 according to the present exemplary embodiment. In FIG. 9, steps for performing the same processing as those in FIG. 7 are denoted by the same step numbers as those in FIG. 7, and processing different from that in FIG. 7 is mainly described below.

In step S21, the image capturing apparatus 100 changes a focus driving range, which is a controllable range of the focus lens 102, based on the correction amount determined in step S5. In other words, the image capturing apparatus 100 changes the focus driving range based on the amount of change in the position of the movable lens caused by the change in the orientation of the lens barrel.

Figure 10A:
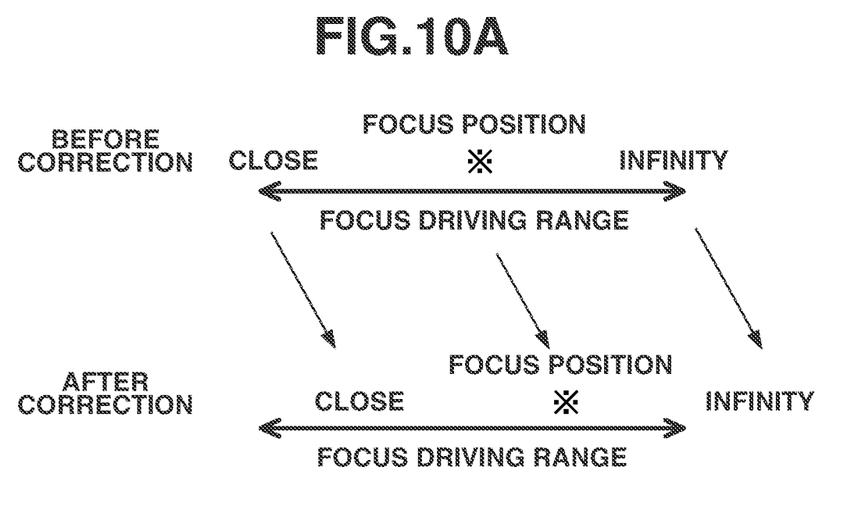
FIGS. 10A and 10B are diagrams illustrating a driving range correction control.

As illustrated in FIG. 10A, in a case where the correction amount is large, if the focus driving range is not changed, even if the image capturing apparatus 100 tries to focus on an object near infinity, the object may not be brought into focus due to a limit on the focus driving range.

Figure 10B:
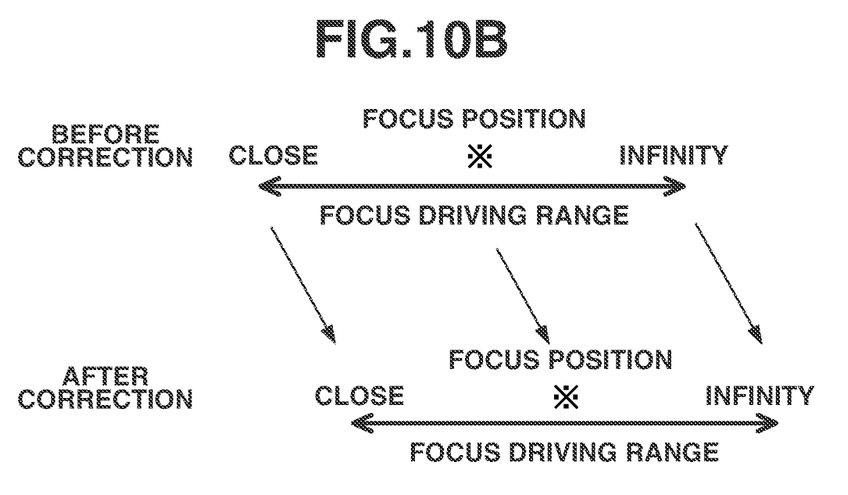

Thus, in the present exemplary embodiment, the focus driving range is changed based on the correction amount as illustrated in FIG. 10B. In other words, the focus driving range is shifted in a direction of correction of the correction amount based on the correction amount. Accordingly, the focus can be appropriately driven from a close distance to infinity.

As described above, the image capturing apparatus 100 according to the present exemplary embodiment can change the focus driving range that is the controllable range of the focus lens 102 based on the correction amount calculated based on the orientation of the lens barrel and the installation direction of the apparatus body. Accordingly, the image capturing apparatus 100 can appropriately perform focus driving to focus on a range of a predetermined object distance.

The present invention can also be realized by supplying a program for implementing one or more functions of the above-described exemplary embodiments to a system or an apparatus via a network or a storage medium, and by one or more processors in a computer of the system or the apparatus reading and executing the program. Further, the present invention can also be realized by a circuit (for example, an application specific integrated circuit (ASIC)) for implementing one or more functions of the above-described exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-076613, filed Apr. 23, 2020, which is hereby incorporated by reference herein in its entirety.

What is claimed is:

1. An information processing apparatus comprising:
  a first obtaining unit configured to obtain optical information about an image capturing apparatus including an imaging optical system including at least one movable lens movable in an optical axis direction;
  a second obtaining unit configured to obtain orientation information indicating an orientation of a lens barrel holding the imaging optical system;
  a third obtaining unit configured to obtain installation information indicating an installation direction of the image capturing apparatus; and
  a control unit configured to control a position of the movable lens based on the optical information, the orientation information, and the installation information.

2. The information processing apparatus according to claim 1, wherein the control unit controls the position of the movable lens based on an amount of change in the position of the movable lens caused by at least one of a change in the orientation of the lens barrel and a change in the installation direction of the image capturing apparatus.

3. The information processing apparatus according to claim 1,
wherein the control unit includes a table in which the optical information about the image capturing apparatus is associated with a control amount of the position of the movable lens for each orientation of the lens barrel, the table being provided for each installation direction of the image capturing apparatus, and
wherein the control unit determines the installation direction of the image capturing apparatus based on the installation information obtained by the third obtaining unit and controls the position of the movable lens using the table corresponding to the determined installation direction.

4. The information processing apparatus according to claim 1, wherein the optical information includes at least one of information about a focal length of the imaging optical system and information about an object distance.

5. The information processing apparatus according to claim 1, wherein the orientation information includes at least one of an angle in a pan direction of the lens barrel and an angle in a tilt direction of the lens barrel.

6. The information processing apparatus according to claim 1, wherein the installation information includes information indicating whether the installation direction of the image capturing apparatus is a normal position installation direction or an inverted position installation direction with respect to a vertical direction.

7. The information processing apparatus according to claim 1, wherein the third obtaining unit obtains the installation information designated by a user.

8. The information processing apparatus according to claim 1, wherein the third obtaining unit obtains the installation information based on an upper direction and a lower direction in an image captured by the image capturing apparatus.

9. The information processing apparatus according to claim 1, wherein the third obtaining unit obtains the installation information based on an output from a gravity sensor provided in the image capturing apparatus.

10. The information processing apparatus according to claim 1, wherein a controllable range of the position of the movable lens is changed based on an amount of change in the position of the movable lens caused by at least one of a change in the orientation of the lens barrel and a change in the installation direction of the image capturing apparatus.

11. The information processing apparatus according to claim 1,
wherein, in a case where it is determined that at least one of the orientation of the lens barrel and the installation direction of the image capturing apparatus changes with respect to a gravity direction, the control unit controls the position of the movable lens to be a position moved from the position of the movable lens determined based on the optical information by an amount of change in the position of the movable lens caused by at least one of a change in the orientation of the lens barrel and a change in the installation direction of the image capturing apparatus, and
wherein, in a case where it is determined that neither the orientation of the lens barrel nor the installation direction of the image capturing apparatus changes with respect to the gravity direction, the control unit controls the position of the movable lens to be the position of the movable lens determined based on the optical information.

12. An image capturing apparatus comprising:
the information processing apparatus according to claim 1;
an imaging optical system including at least one movable lens movable in an optical axis direction;
an image capturing element configured to perform photoelectric conversion on an object image formed by the imaging optical system;
a lens barrel configured to hold the imaging optical system;
a first driving unit configured to change the orientation of the lens barrel; and
a second driving unit configured to move the position of the movable lens.

13. A method for processing information, the method comprising:
obtaining optical information about an image capturing apparatus including at least one movable lens movable in an optical axis direction;
obtaining orientation information indicating an orientation of a lens barrel including the movable lens;
obtaining installation information indicating an installation direction of the image capturing apparatus; and
controlling a position of the movable lens based on the optical information, the orientation information, and the installation information.

14. A non-transitory computer-readable medium storing a program that when executed on a computer causes the computer to execute the method according to claim 13.

* * * * *